Oct. 8, 1929.   I. R. GARDNER   1,730,418
APPARATUS FOR TEACHING MATHEMATICS
Filed May 31, 1927
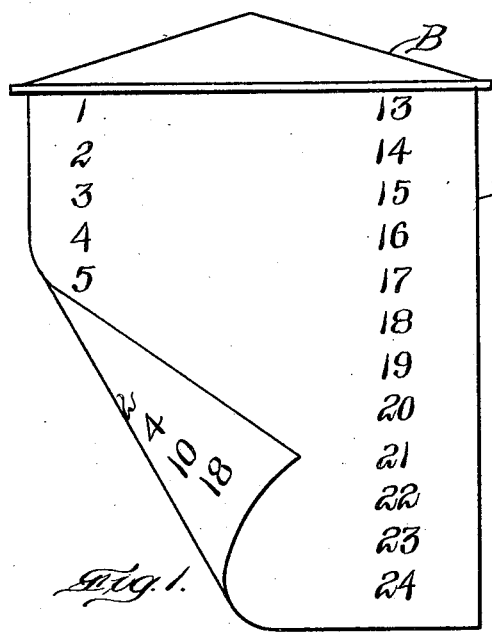
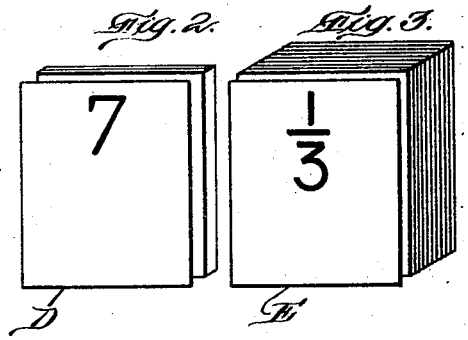
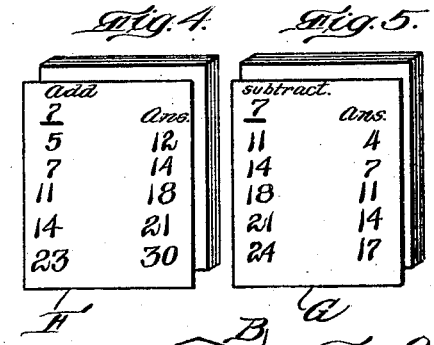
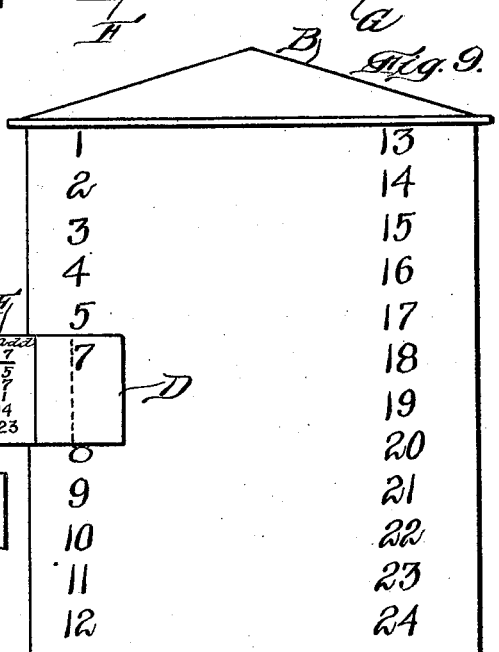

Patented Oct. 8, 1929

1,730,418

UNITED STATES PATENT OFFICE

ISABEL R. GARDNER, OF BOSTON, MASSACHUSETTS

APPARATUS FOR TEACHING MATHEMATICS

Application filed May 31, 1927. Serial No. 195,183.

The principal object of my invention is to teach mathematics, particularly arithmetic, in such a way that the pupils will be interested and their mental activity increased.

A feature of my invention is the provision of a relatively large chart having numbers thereon readily visible to the pupils and for use with the chart a card, for example, having thereon a number, the word number including a fraction.

Another feature is the provision of another card having thereon said number on the first-mentioned card and a list of numbers and corresponding answers the numbers appearing also on the chart so that the chart and the two cards are interrelated for teaching purposes.

Another feature is different sets of cards, each set consisting of a plurality of cards. One set relates to addition, another to subtraction, another to multiplication, another to division and another to fractions.

Other features of my apparatus and method will be referred to below.

In the drawing

Figure 1 is an elevation of a chart forming part of my invention, one corner being turned back to show a portion of the disordered numbers on the rear surface;

Figure 2 is a perspective view of a group of cards, each of which is marked with a number;

Figure 3 is a perspective view of a group of cards, each of which is marked with a fraction;

Figure 4 to 8 are perspective views of groups of cards marked with answers for addition, subtraction, multiplication, division and fractions.

Figure 9 is an elevation of the chart and of a card of Figure 2 and of a card of Figure 4 in operative relation; and Figure 10 is an elevation of a card of Figure 2 and a portion of the chart in operative relation.

The chart A may be any suitable construction and may be suspended by cord B, the chart having on one face numbers from 1 to 24, for example, all of these numbers being shown in Figure 1 except numbers 6 to 12 which are hidden because the lower left portion is turned back to show that on the reverse face of the chart the numbers, which may include numbers 1 to 24, are in disordered arrangement. More than 24 numbers may be used if desired.

In Figure 2 I show a group of cards, preferably six, each card, such as D, having a number on its front face, the number shown being the numeral 7. On the back face of card D there will be another number such as the numeral 8 and so, with six cards, there will be available numerals 1 to 12, each face having only one numeral.

In Figure 3 I show a similar group of cards for fractions, the face of the card E having a number in the form of a fraction 1/3 and the reverse face having a different fraction. By using 33 cards (indicated in Figure 3) and having separate numbers on the front and rear faces I may have the fractions 1/12, 2/12 and so on up to and including 11/12; 1/11, 2/11 and so on up to and including 10/11; and so on to the denominator 2, the fraction being 1/2. These cards will provide 66 fraction numbers.

In Figure 4 I show a group of cards for addition, preferably five, each card, such as F, having a number such as 7 and below this number a vertical list of numbers to which the indicator is to be added and at the opposite edge a vertical and corresponding list of answers. For example, the answer to 7 plus 5 is 12 and the answer to 7 plus 14 is 21. Each card will have on its reverse face a different numeral number and may have any desired list of numbers to be added and also corresponding answers.

In Figure 5 I show a similar group of cards, preferably five, for subtraction, each card, such as G, having a number such as 7 which is to be subtracted, for example, from 21 to give the answer 14.

Figures 6 to 8 show similar groups of similar cards for multiplication, division and fractions, respectively.

In using my invention the chart A is placed so that the numerals thereon will be clearly visible to all the pupils and I may expose the face having the numbers in order, or in disorder as indicated in the turned back portion of Figure 1, one advantage of the disordered arrangement being that the pupils can not observe from the chart itself what the answer may be, as, for example, if the problem were to add 5 to 4 the pupil might, if the numbers were in order, count down 5 numbers from 4 on the chart and find 9. This he could not do if the arrangement were disordered.

The teacher then selects a card such as D and holds it in adjacency to the chart preferably beneath the desired number as indicated in Figure 10, the problem here being to add 7 to 5. The pupils may answer orally or may write the answer. The card may then be moved into similar adjacency to any other desired numbers.

Similarly for purposes of subtraction one of the cards of Figure 2 will be placed in adjacency to any desired numbers on the chart, although the card number should be less than the number into adjacency with which it is brought.

Similarly one of the cards of Figure 2 will be used for problems in multiplication and division and similarly one of the cards of Figure 3 will be used for problems in fractions.

It is preferable to have the size of the number as 7 in Figure 2, the same in height as the size of the numbers on the chart, although in the drawings, for economy of space, the numbers on the chart are actually smaller.

The cards shown in Figures 4 to 8 are preferably used in interrelation to the cards of Figures 2 and 3. In Figure 9 card D is so placed with relation to card F that the list of answers is hidden from the pupils and the cards D and F may be conveniently held together in this relation by a clip. When in such relation the card D will be placed so that its number is in adjacency to the numeral 5 on the chart. The pupils will then write the answer to the problem which is to add 7 to 5. The cards D and F are then moved so that the number 7 is in adjacency to the numeral 7 on the chart and so on in accordance with the list of numbers at the left of card F, this list being for the convenience of the teacher as a record of the problems in order and the corresponding answers on the card F being for convenience and for comparison with the answers of the pupils.

Any desired number on the front or back of any card of Figure 2 may be used in relation to the front or back face of any card of Figures 4 to 7 and the desired number on the front or back of any card, such as E, of Figure 3 may be used with a corresponding card of the group of Figure 8, such as card H.

What I claim is:

1. An apparatus for teaching mathematics comprising a member having one or more numbers thereon, and another member having a number, said other member being movable by the teacher into adjacency to the desired number on the first member for the purpose of computation between the numbers on said members.

2. An apparatus for teaching mathematics comprising a chart having a plurality of numbers thereon in non-numerical arrangement, and a card having a number, said card being movable by the teacher into adjacency to the desired number on the chart for the purpose of computation between the numbers on the chart and card.

3. An apparatus for teaching mathematics comprising a member having a plurality of numbers, and another member having one number only, said other member being movable by the teacher into adjacency to the desired number on the first member for the purpose of computation between the numbers on said members.

4. An apparatus for teaching mathematics comprising a chart having a plurality of numbers arranged in a vertical row, and a card having a number adjacent to the top edge of the card, the depth of the card being such as to obscure several of the numbers on the chart when the top edge of the card is placed immediately below the desired number on the chart.

5. An apparatus for teaching mathematics comprising a chart having a plurality of numbers arranged in a row; and a card having a number adjacent to an edge of the card, the dimension of the card in the direction of said row being such as to obscure several of the numbers in said row when said edge is placed in adjacency to the desired visible number on the chart.

ISABEL R. GARDNER.